(12) United States Patent
Garcia

(10) Patent No.: US 6,962,353 B1
(45) Date of Patent: Nov. 8, 2005

(54) MOBILE RECYCLE BIN STACKER

(76) Inventor: Gary M. Garcia, 6202 Pompano St., Palm Beach Gardens, FL (US) 33418

(*) Notice: Subject to any disclaimer, the term of this patent is extended or adjusted under 35 U.S.C. 154(b) by 0 days.

(21) Appl. No.: 09/572,012

(22) Filed: May 16, 2000

Related U.S. Application Data

(63) Continuation-in-part of application No. 09/028,182, filed on Feb. 23, 1998, now abandoned, which is a continuation-in-part of application No. 08/623,246, filed on Mar. 28, 1996, now abandoned.

(51) Int. Cl.[7] .............................................. B62B 1/14
(52) U.S. Cl. ............................. 280/47.19; 280/47.24; 248/215
(58) Field of Search ..................... 280/47.19, 47.17, 280/47.24, 47.26, 47.35, 79.3, 652, 33.998, 280/47.131; 248/322, 307, 215, 304, 301, 248/230.7, 231.81, 340

(56) References Cited

U.S. PATENT DOCUMENTS

| | | | | |
|---|---|---|---|---|
| 3,076,664 A | * | 2/1963 | Baird ....................... | 280/47.19 |
| 3,972,499 A | * | 8/1976 | Simmons ............... | 248/225.21 |
| 4,363,496 A | * | 12/1982 | Schreiner ................ | 280/47.35 |
| 4,821,903 A | * | 4/1989 | Hayes .................... | 280/47.26 |
| 4,984,704 A | * | 1/1991 | O'Malley ................. | 220/23.4 |
| 5,160,154 A | * | 11/1992 | Seydel et al. ............ | 280/47.19 |
| 5,192,092 A | * | 3/1993 | DiBenedetto ............... | 280/654 |
| 5,464,104 A | * | 11/1995 | McArthur ................ | 211/133.3 |
| 5,531,416 A | * | 7/1996 | Remmers ............... | 248/222.51 |
| 5,595,395 A | * | 1/1997 | Wilson .................... | 280/47.26 |
| 5,758,886 A | * | 6/1998 | Mayer .................... | 280/47.26 |
| 5,845,915 A | * | 12/1998 | Wilson .................... | 280/47.19 |
| 6,086,030 A | * | 7/2000 | Hepworth .................. | 248/215 |
| 6,131,926 A | * | 10/2000 | Harlan ................... | 280/47.26 |
| 6,179,306 B1 | * | 1/2001 | Maxwell .................. | 280/47.26 |
| 6,224,072 B1 | * | 5/2001 | Weck et al. ............. | 280/47.35 |
| 6,382,642 B1 | * | 5/2002 | Rainey .................... | 280/47.24 |

* cited by examiner

Primary Examiner—Christopher P. Ellis
Assistant Examiner—Jeff Restifo
(74) Attorney, Agent, or Firm—McHale & Slavin, P.A.

(57) ABSTRACT

A mobile bin cart which supports recycling bins. The cart has a vertically oriented frame with wheels at the bottom for tilting back and moving the cart. A plurality of horizontal cross braces spans the frame, with each brace vertically mounted above the others. At least two contoured support brackets are adjustably mounted to each cross brace so that the hook elements are oriented vertically upwards. The circumferential lip of a standard recycling bin is then supported by the hook elements, with the bin swinging backward to butt against the cart frame for additional support. The bins can then be removed and replaced with a vertical lifting motion hence making loading and unloading the cart much easier for the user.

2 Claims, 4 Drawing Sheets

MOBILE RECYCLE BIN STACKER

MOBILE RECYCLE BIN STACKER

MOBILE RECYCLE BIN STACKER

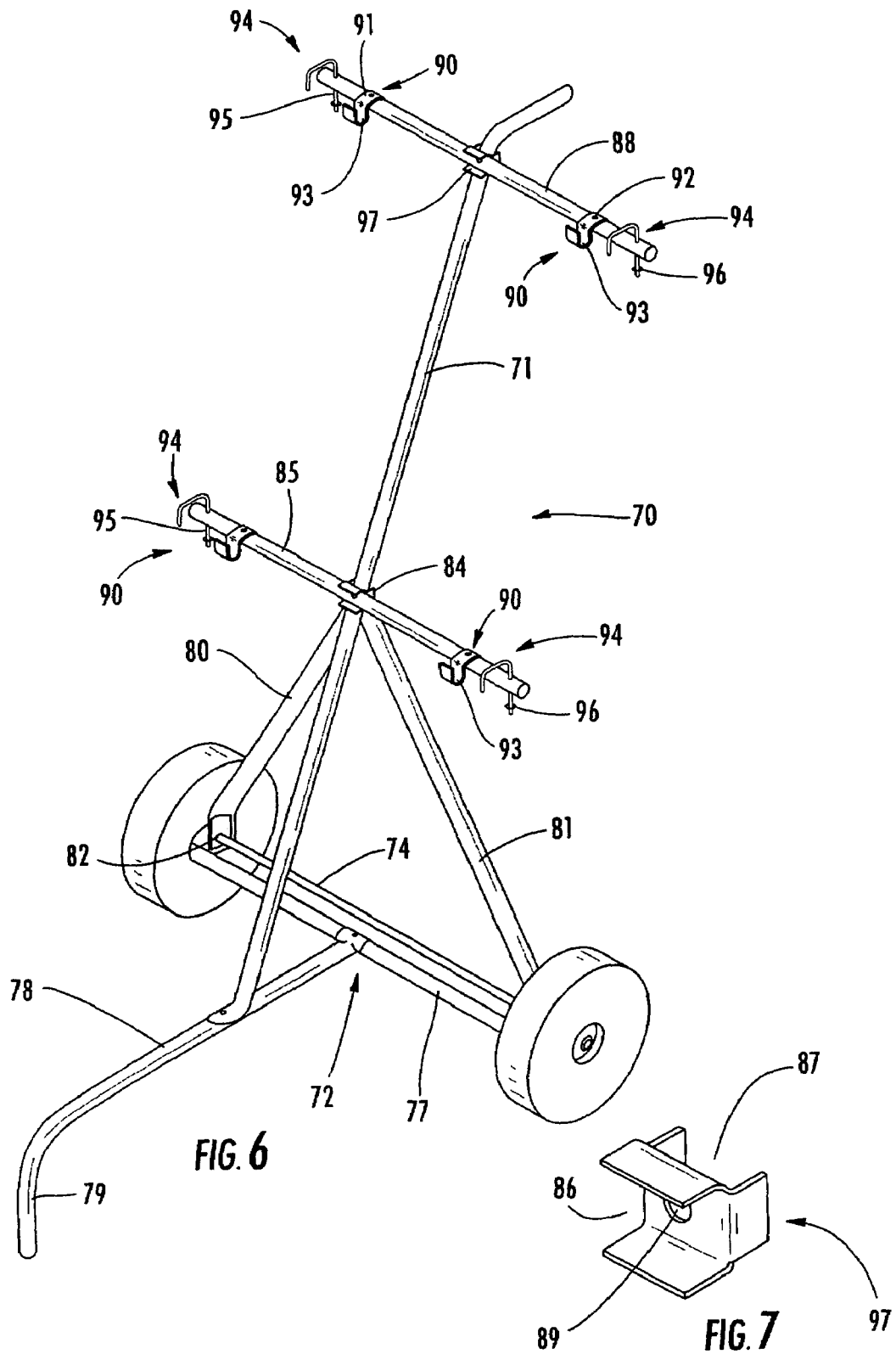

MOBILE RECYCLE BIN STACKER

This is a continuation-in-part of application Ser. No. 09/028,182 filed on Feb. 23, 1998, now abandoned, which is a continuation-in-part of application Ser. No. 08/623,246 filed on Mar. 28, 1996, now abandoned.

FIELD OF INVENTION

This invention relates to a carrying device which facilitates releasable attachment of recycling bins in a stacked arrangement onto a wheeled cart for transport.

BACKGROUND OF THE INVENTION

Recycling of waste products is a continuing concern of individuals and communities as natural resources are depleted and landfills filled to capacity. In many places, the government mandates the separation of garbage into recyclable categories, such as glass, plastics, paper, etc. Standardized recycling bins facilitate the efficient collection of such recyclable materials. When filled with materials such as metal cans or glass, these bins can often become heavy and cumbersome to move.

As a result, the prior art includes a variety of carts for moving recycling bins. U.S. Pat. No. 5,192,092 discloses a recycling bin carrying device with at least two horizontally extending shelves for holding loaded bins. The cart is designed with each horizontally extending shelf positioned so as to overhang the next shelf, with the bins being slid onto the desired carrying shelf as necessary. The design also suggests that the bin containing the heaviest materials be located close to the ground for easy removal. Each shelf is pivotally attached to a front and back frame which allows for simultaneous folding of the front frame and shelves against the back frame to facilitate storage.

The '092 patent employs horizontally extending shelves which are oriented in a step-like fashion, each subsequent shelf overhangs the next and generally interferes with placement of a bin on the shelf. Instead of being able to vertically place the bin, the user must reach outward to slide the bin onto its desired shelf. As a result, the shelf-like orientation makes it difficult to load and unload bins onto the cart, particularly if they are heavily loaded. The patent also suggests a preference and is constructed for loading the heaviest bins on the bottom shelf. This complicates the ease of usage because a user must bend over further to pick up the heaviest bin. This is often very difficult, particularly for older users, and users with back problems.

U.S. Pat. No. 4,821,903 discloses a tubular metal cart which accommodates a plurality of bins placed side-by-side on the cart bracing. Each rectangular bin is a specially shaped, vertically-oriented, canister-like receptacle with a handle on the outwardly facing front. Each side-by-side rectangular bin is then simultaneously accessible from the top, with a common pivoting lid being used to hold the bins in place during transport.

In the '903 patent, the bins are not stackably oriented, and accordingly each bin must be lifted from its position on the bottom bracing of the cart. Each bin has single handle on its front which facilitates carrying the bin like a pail, albeit with the bin angled accordingly. Reloading the bin onto the cart involves reorienting the bottom of the bin to the horizontal plane and sliding it onto the cart. While this might be easily achievable with an empty bin, it would be very difficult with a loaded, heavy bin. The weight of the bin would cause resistance to both the horizontal orientation and sliding movements.

U.S. Pat. No. 5,160,154 discloses a hand truck having a single vertical frame member for transporting multiple bins. The vertical has a handle on one end and an axle assembly on the other. The frame may be tubular metal with horizontal supports attached to the vertical member for holding the weight of the bins. Above each sup ort is a horizontal channel shaped member into which the edges of the bins are inserted.

Accordingly, a bin carrying device is needed which receives standard sized, rectangular tub-shaped recycling bins, which are removably attached via a hook device to the front of the cart. The device should allow for the bins to be vertically loaded and unloaded onto the cart in a sequential fashion for convenience and ease of loading. Such an arrangement would allow the heaviest bins to be loaded on the top hooks so that the user will not have to bend down to lift and move the loaded bin.

SUMMARY OF THE INVENTION

The present invention teaches a recycling bin cart for stackably accommodating standard sized recycling bins having a rectangular tub and an overhanging lip. The dolly-like bin cart consists of first and second handled side members which are attached to respective first and second leg members. The leg members are wheeled at the back and have a support appendage at the front. Various cross-bracing members complete formation of the cart frame. A plurality of cross braces horizontally span between the first and second side members to support placement of contoured support brackets, usually two per cross bracing member. An upturned retention arm of these brackets supports removable placement of a recycling bin by catching.

Another embodiment of the invention has a single vertical member with a handle on the upper end. A plurality of cross braces are fixed, by brackets, to the single vertical member along it's length. The cross braces carry hooks and load clips for movable placement of the bins. The lower end of the vertical member is attached to an axle assembly through the single leg member.

With this stacked arrangement, each bin can be easily unloaded and loaded onto the cart in an upward and downward vertical motion. This is advantageous because heavy loads are more optimally carried close to the user's body, as lifted more properly by the user's legs. Any other motion puts the back and arms at risk of injury due to the weight of the load. Hence, the present invention promotes a more safe lifting motion in that the user can position his hands on either side of the recycling bin, with the back held straight and the chest oriented towards the center of gravity of the load. The load is then lifted straight up off the hooks and carried to its destination. With the stacking arrangement, once the uppermost bin is removed, then the next bin down can be similarly lifted upwards. Also, the cart frame is constructed to facilitate supporting the heaviest bins on the uppermost hooks so that a user might not have to bend over to pick up and move the heaviest bins.

Accordingly, it is an object of the present invention to provide a wheeled recycling bin cart which facilitates removable placement of standardized recycling bins in a vertically stacked orientation.

It is yet another object of the present invention to provide a wheeled recycling bin cart with cross-braces spanning the cart frame and hooks attached to the cross-braces for supporting recycling bins.

It is still a further object of the present invention to provide contoured support brackets which releasably interface with the overhanging lip of standard recycling bins.

It is an additional object of the present invention to provide a means for supporting recycling bins of varying size that is adjustable without tools.

It is another object of the present invention to provide contoured support brackets which suspendably support each recycling bin so that the cart frame provides bracing support against the inwardly-facing side of the bin.

It is a further object of the present invention to provide a recycling bin cart with a single vertical frame member carrying cross braces for supporting standard recycling bins. The cross braces having U-shaped hooks and J-shaped load clips for removable attachment of the bins.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

FIG. 6 shows a perspective view of a modified mobile recycling bin cart.

FIG. 7 shows a perspective view of a bracket for mounting cross braces on the cart of FIG. 6.

DETAILED DESCRIPTION OF THE PREFERRED EMBODIMENT

Although the invention has been described in terms of a specific embodiment, it will be readily apparent to those skilled in this art that various modifications, rearrangements and substitutions can be made without departing from the spirit of the invention. The scope of the invention is defined by the claims appended hereto.

Figure 1:
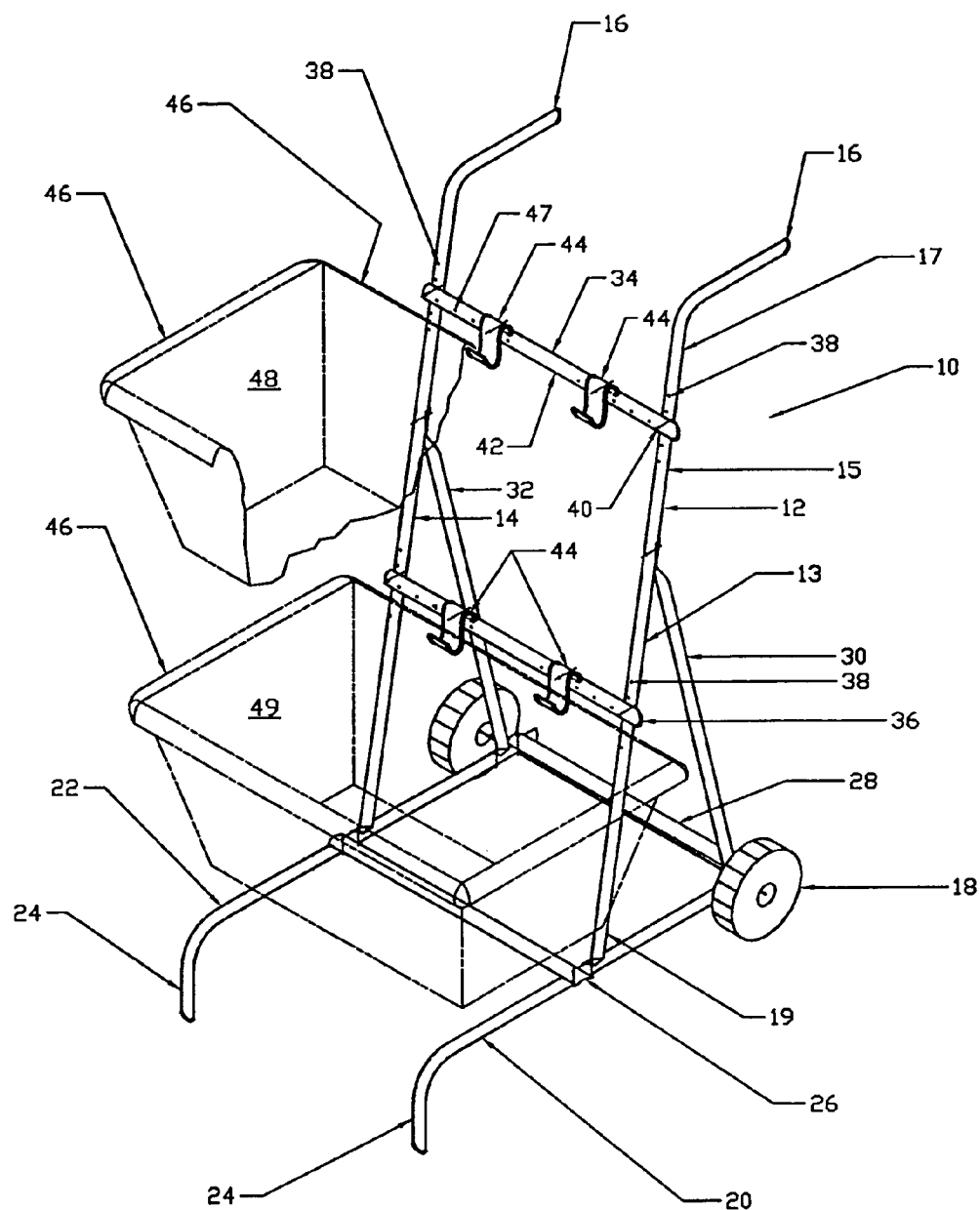
FIG. 1 shows a perspective view of a mobile recycling bin cart which facilitates vertical stacking orientation of the recycling bins.

Referring now to FIG. 1, the recycling bin cart 10 is shown with various parts drawn in phantom to more fully illustrate the invention. A first side member 12 and second side member 14 are shown parallelly disposed, each having a front edge 13, a back edge 15, a top portion 17 and a bottom portion 19. Each top portion has a handle 16 curving backwards and angled upwards to facilitate a more horizontal disposition of the handle when the cart is tilted back on its wheels 18. Each side member 12, 14 is attached to corresponding leg member 20 and 22 which each support a wheel 18 at the back and have a curved leg support appendage 24 at the front. The cart framework includes a pair of parallel cross braces 26 and 28 spanning the leg members 20 and 22. Additionally, a pair of angled cross braces 30 and 32 join the back of the leg members 20, 22 to the back of their corresponding side members 12, 14.

Another pair of horizontally disposed cross braces 34 and 36 are attached spanning the side members 12 and 14. These cross braces are attached via an attachment means such as a nut and bolt combination. A plurality of attachment holes 38 exist on the side members 12, 14 so that each brace 34, 36 can be positioned and attached to the side members. The cross brace members 34, 36 have corresponding mounting holes 40 through each end for aligning with the attachment holes 38. As a result, the cross braces 34, 36 can be positioned and attached at varying elevations according to user preference.

The cross braces 34, 36 in this embodiment are cylindrical, and the outer surface 42 of each cross braces 34,36 receivably interfaces with a pair of contoured support brackets 44 which are attached thereto. Each cross brace 34, 36 includes a series of alignment notches 47 which allow for lateral positioning and attachment of the support brackets 44 to the cross braces 34, 36. In keeping with the objects of the present invention, the alignment notches 47 not only provide preferred locations for the positioning tabs 58, they also hold the notches securely, without the need for separate fasteners. As a result, the support brackets may be attached, removed, and re-positioned all without the need for tools. In an alternate embodiment, the alignment notches 47 may form a horizontal track, not shown, that spans the length of the cross braces 34, 36. In either embodiment, the positioning tabs 58 serve to hold the support brackets 44 securely in a multitude of positions along the width of the associated cross braces 34, 36. The positioning tabs 58 also prevent rotation of the support brackets 44, with respect to the cross brace central axis. In this way, the support brackets 44 can be positioned to securely handle heavier loads in any given bin, without hook rotation. This arrangement also allows the support brackets 44 to be positioned as needed without tools.

Figure 4:
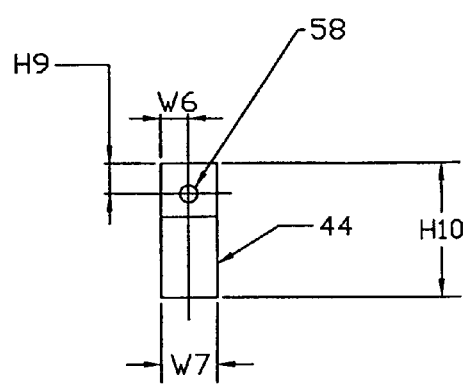
FIG. 4 shows a side view of the support bracket of FIG. 3.

As shown in FIG. 4, each support bracket 44 is a one-piece, multi-function element shaped with regions that each serve a particular function. For example, each support bracket includes an L-shaped retention arm 52 that will engage the lip 46 of a bin 48,49 placed thereon. Additionally, each support bracket 44 includes integral attachment means 54 shaped to firmly engage the outer surface 42 of a corresponding cross brace 34,36. In a preferred embodiment, the attachment means 54 is an arc-shaped recess and one of the above-mentioned positioning tabs 58 extends toward the center of the recess 54. The attachment means 54 may be many shapes, in accordance with the shape of the included cross braces 34,36.

Each support bracket 44 is removably secured onto a cross brace 34,36 through cooperation between the attachment means 54, the positioning tab 58, and a cross brace alignment notch 47. More particularly, the positioning tab 58 is placed within a selected alignment notch 47, and the support bracket 44 is pivoted about the alignment notch 47 until the bracket attachment means 54 snaps into place, partially-encircling a portion of the cross brace outer surface 42. The support brackets 44 are preferably constructed from a resiliently deformable plastic to allow repeated installation and removal, other rigid materials may be used if desired.

Each support bracket 44 includes an arcuate guide notch 45 that directs a user's finger into a preferred location during support bracket removal and installation. By using the guide notch 45, leverage is maximized and the force needed to attach or remove the support bracket 44 is reduced. The bins 48 and 49 are placed so that a portion of the rearward lip 46 interacts and is supported by the support bracket retention arms 52. The bottom of each bin 48, 49 will then swing backwards to rest against the front surface 13 of the side members 12, 14. In this position, each bin 48, 49 will securely ride on the cart when it is in either the vertical position with the feet 24 resting upon the ground, or in the mobile position with the cart tilted backwards upon the wheels 18.

While only two cross braces 34, 36 are shown, any number might alternatively be used to accommodate a corresponding number of larger or small bins. In each case, the bins can be sequentially placed in position upon the support brackets 44 in a stacked fashion until the cart is fully loaded with bins. For instance, the bottom bin 49 would first be placed upon the support brackets 44 attached to cross brace 36 without the any other bins in place. This would allow the user to use a vertical lifting motion to pick up and place the bin, without being impeded by other bins. Subsequently, the upper bin 48 could be placed onto the support brackets 44, as attached to cross brace 34, with similar ease. While not optimal for lifting, the lower bin 49 could be removed and replaced with the uppermost bin still in place. Accordingly, the cross braces 34, 36 are located a sufficient distance apart to allow enough headroom for lifting each lower bin.

Figure 2:
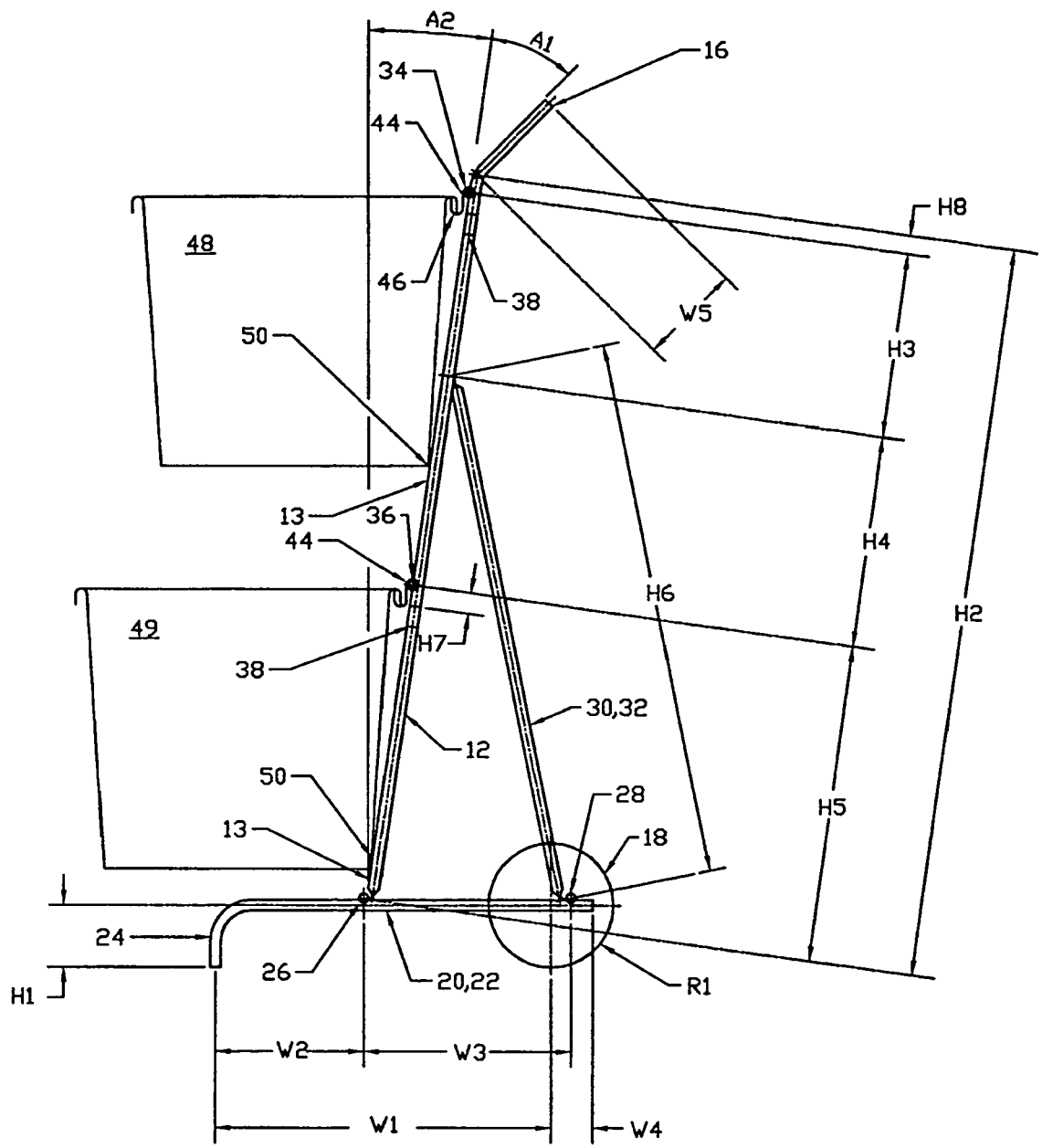
FIG. 2 shows a side view of the mobile recycling bin cart of FIG. 1.

Referring now to FIG. 2, a side view of the mobile recycling bin cart 10 of FIG. 1 is shown with various dimensions as used on the illustrated embodiment. Each leg member 20, 22 has an appendage 24 extending downward a height h1. Cross brace 26 is attached to each leg member a width w2 from the front. Cross brace 28 is mounted a width w3 back from brace 26. The center of each wheel 18 is located a width w1 from the front of each leg member, and a width w4 from the back, with the wheel having a radius of R1. The lower cross brace 36 is attached at a height h5 from the bottom of the side members 12, 14. The plurality of attachment holes 38 are generally spaced h7 apart. The angled side braces 30, 32 are of height h6 and are mounted to each leg member immediately in front of the cross brace 28. The upper end of each brace 30, 32 is attached to the side members 12, 14 at a height h4 above cross brace 36. The upper-cross brace 34 is attached to the side members 12, 14 at a height h3 above the angled brace 30, 32 attachment point. The handle 16 angles backward a1 degrees from the side members 12, 14 at a height h2 from the bottom, and h8 from the cross brace 34, each handle having a width w5. The side members 12, 14 are additionally angled a2 degrees back from perpendicular to facilitate a more comfortable carting action.

The upper bin 48 and lower bin 49 are shown suspended from support brackets 44 which are attached to cross braces 34, 36. As this side view more clearly illustrates, the lip 46 of the bin rests inside the upturned retention arm 52 of the support bracket 44. The lower rear part 50 of the bin rests against the front surface 13 of the side members 12, 14. This arrangement provides for convenient loading and unloading of the bins 48, 49 onto their respective support brackets 44, wherein each bin rides securely against the cart side members 12,14 while the cart 10 is at rest and during cart motion.

Figure 3:
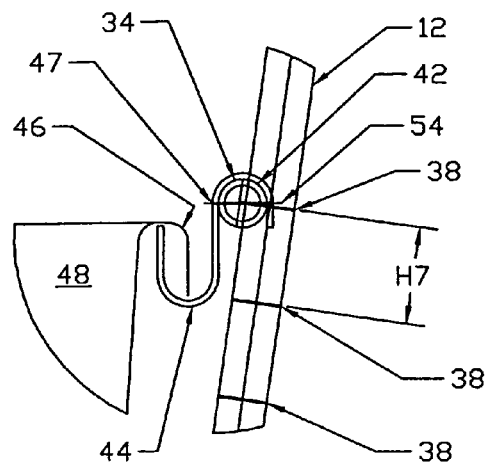
FIG. 3 shows a side view of one cross-brace and bracket arrangement as used to suspend the recycling bin by its overhanging lip.

Referring now to FIG. 3, a more detailed cross sectional view of the cross brace 34, attached support bracket 44, and supported bin 48 are shown. The cross brace 34 includes a series of alignment notches 47, with each notch being recessed into the cross beam outer surface 42. Each alignment notch 47 is sized and positioned to accept the support bracket positioning tabs 58. The support bracket attachment means 54 partially encircles the support bracket outer surface 42. The retention arm 52 engages the lip 46 of the bin 48. The cross brace 34 might be mounted at several vertical levels via alignment of brace holes 40 with the different through holes 38 which are located $h_7$ apart.

Figure 5:
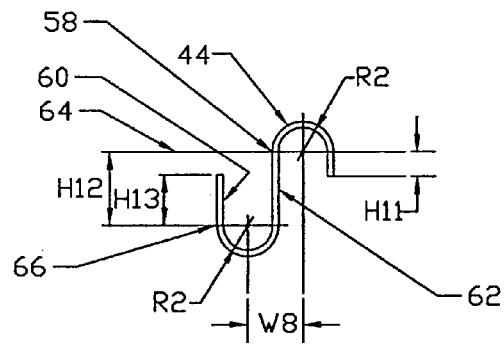
FIG. 5 shows a cross sectional view of the support bracket of FIG. 3, taken along line 5—5 in FIG. 4.

Referring jointly now to FIGS. 4 and 5, the support bracket 44 is shown with preferred dimensions. The support bracket 44 has a width $W_7$ and an overall height of $h_{10}$. The positioning tab 58 aligns with a selected alignment notch 47 on the cross brace 34,36. As seen in the Figures, the support bracket 44 is a single-piece member. The brackets 44 are formed from resiliently-deformable plastic. The retention arm 52 which receives and supports the bin has a height of h13. The retention arm is spaced apart from the attachment means 54 by a width $w_8$. The attachment means has radius $R_2$ and the guide notch has a radius of $R_3$.

While the relative dimensions shown in these Figures might be used in any combination to achieve the teachings and advantages of the present invention, the preferred embodiment uses approximately the following measurements: $h_1$=3 inches; $h_2$=2 feet, 11½ inches; $h_3$=9 inches; $h_4$=10 inches; $h_5$=1 foot, 3½ inches; $h_6$=2 feet, 2 inches; $h_7$=1 inch; $h_8$=1 inch; $h_{10}$=2.52 inches; $h_{13}$=1.67 inch; $w_1$=1 foot, 4 inches; $w_2$=7 inches; $W_3$=10 inches; $W_4$=2 inches; $w_5$=5 inches; $w_7$=0.38 inch; $w_8$=0.38 inch; $R_1$=3 inches; $R_2$=0.46 inch; $R_3$=0.42 inch.

The mobile bin cart 70, shown in FIG. 6, has a single vertical frame member 71 attached at the lower end to an axle assembly 72. The upper end of the vertical member is formed as a handle 73.

The axle assembly 72 has an axle 74 connecting wheels 75 and 76. Parallel to the axle 74 is a spacer bar 77 extending between each wheel. A single leg member 78 is attached to the center of the spacer bar and extends under the recycling bins when they are in place. The leg member terminates in an appendage 79 which is curved downwardly approximately the radius of the wheels and provides a support and brake for the cart, at rest. The lower end of the vertical member 71 is attached to the leg member 78. The location of the attachment of the vertical member and the leg member provides a sloped orientation for the multiple bins which partially uncovers the mouth of each bin on the cart.

The axle assembly includes angled braces 80 and 81 which extend from the opposite ends of the spacer bar upwardly to the vertical member. The lower ends of the braces have apertures 82 and 83 through which the axle 74 extends. The lower ends of the braces are also attached to the spacer bar about the axle. The upper ends of the braces are connected to the vertical member and themselves by a bracket 84. The pyramidal structure provides reinforcement and rigidity to the lower part of the cart to resist the twisting forces the bins exert on the frame when the cart is in motion.

The bracket 84 serves to attach the ends of both angled braces and cross brace 85 to the vertical frame member 71. The bracket 84 is similar to the bracket 85. Bracket 85, shown in FIG. 7, has a horizontal channel 86 on one side and an vertical channel 87 on the opposite side. The cross brace 88 fits into the horizontal channel 86 and the vertical frame member 71 is held in the vertical channel 87. The side walls of the horizontal channel 86 of the bracket 85 provide sufficient support to hold a full bin. The channel 86 also prevents the cross brace 88 from turning about the vertical member 71. The vertical channel of bracket 84 holds the ends of the angled braces in addition to the vertical member. Both brackets 84 and 85 have an central aperture 89 for mounting on the cart.

The brackets may be fastened on the frame by a bolt through this aperture or other means such as welding or casting. As shown in the drawings, the bolts attach the cross braces and the brackets to the vertical frame member. Other fastening devices could be used, such as rivets or pins.

At least one hook is attached to each cross brace 85 and 88 on either side of the vertical frame member. These hooks fit into the overturned lip of the bins and support the weight of the bin. Located beside each hook is a load clip which fits over the lip of the bin. The load clips offset the bending moment the hooks produce in the bin lip and prevent the lip from tearing in the vicinity of the hooks. In effect, the load clips act as reinforcement of the lip.

Cross braces 85 and 88 have hooks 90 and 91 disposed on opposite sides of the vertical member 71. The hooks have a planar fastening plate 91 fixed to the cross brace by a pin, rivet or bolt and nut 92. The hooks are spaced so as to accommodate the normal sized recycling bin and fit into the lip near the corners of the bin. The curved portion of the hook 93 is sufficiently long to permit the end of the hook to rest against the bottom of the overturned lip without interference.

Located adjacent to each hook is a load clip 94. The load clip 94 is formed like an upside-down J. The shaft 95 of the J is slidably connected to the cross brace 85 so that the clip may move toward or away from the wheels 75 and 76. The end of the shaft of the J has an enlargement 96 around it. The enlargement 96 may be a washer or rubber doughnut which prevents the load clip from becoming separated from the cross brace.

In operation, the recycling bin is placed on the cart with the hooks inserted into the lip of the bin. The load clips are then moved upwardly, away from the wheels, and turned so that the short end of the J is placed inside the mouth of the bin. The load clip is then pressed down to engage the rim of the bin in the curved portion of the J shape. In this manner, the load clip reinforces the lip of the bin in the area of the hook.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and descriptions.

What is claimed is:

1. A mobile bin for removably holding and transporting recycling bins in a vertically stacked orientation, said cart comprising:

a transport frame having an axle and a pair of wheels mounted on opposite ends of said axle, an elongated vertical frame member mounted on said axle intermediate said wheels and extending normal to said axle, said vertical frame member having a plurality of parallel cross braces connected thereto and extending normal to said frame member and spaced along said frame, each of said plurality of cross braces separated by a distance approximating the depth of a recycling bin, each of said cross braces having a plurality of hooks for support of said recycling bins, each of said plurality of hooks having one end connected to each of said plurality of cross braces and extending between said plurality of cross braces and said axle, terminating in a free end, and a plurality of J-shaped load clips located proximate to each of said plurality of hooks and adapted for insertion of the short end of said J-shaped load clip onto the rim of said bin; and at least one recycling bin having an open mouth and including a curved lip about said open mouth, said at least one recycling bin supported by one of said plurality of cross braces with said free end of said plurality of hooks engaged in said lip providing support of said recycling bin, and said at least one recycling bin resting on said frame and said J-shaped load clips for opposing the bending moment of said hooks.

2. A mobile bin cart of claim 1, wherein said elongated vertical frame member has a handle formed at one end.

* * * * *